United States Patent

Hausrath

[11] Patent Number: 5,791,728
[45] Date of Patent: *Aug. 11, 1998

[54] GUIDE MECHANISM FOR THE COVER PLATE OF A VEHICLE SUNROOF

[75] Inventor: Udo Hausrath, Hadorf, Germany

[73] Assignee: HS Products AG, Systemtechnik und Produktmanagement, Krailling, Germany

[*] Notice: The term of this patent shall not extend beyond the expiration date of Pat. No. 5,730,487.

[21] Appl. No.: 601,000

[22] PCT Filed: Sep. 7, 1994

[86] PCT No.: PCT/EP94/03016

§ 371 Date: Mar. 5, 1996

§ 102(e) Date: Mar. 5, 1996

[87] PCT Pub. No.: WO95/07192

PCT Pub. Date: Mar. 16, 1995

[30] Foreign Application Priority Data

Sep. 8, 1993 [DE] Germany ............... 43 30 426.5

[51] Int. Cl.⁶ .................................................. B60J 7/047
[52] U.S. Cl. ...................... 296/216; 296/223; 296/224

[58] Field of Search ....................... 296/216, 220, 296/222–224

[56] References Cited

FOREIGN PATENT DOCUMENTS

| | | | |
|---|---|---|---|
| 3906866 | 9/1989 | Germany. | |
| 3839402 | 11/1989 | Germany. | |
| 3910894 | 11/1989 | Germany. | |
| 60-219121 | 11/1985 | Japan. | |
| 286830 | 12/1987 | Japan | 296/216 |
| 3-025026 | 2/1991 | Japan | 296/223 |
| 227721 | 10/1991 | Japan | 296/216 |
| 4-334623 | 11/1992 | Japan | 296/216 |
| 5-050857 | 3/1993 | Japan | 296/221 |
| 88/01949 | 3/1988 | WIPO | 296/216 |

Primary Examiner—Dennis H. Pedder
Attorney, Agent, or Firm—Evenson, McKeown, Edwards & Lenahan, PLLC

[57] ABSTRACT

A device for guiding a cover of a vehicle sliding roof (8) in the region of a roof aperture (35) of a vehicle roof, wherein the mechanical means for controlling the movement of the sliding roof cover (8) of the roof aperture (35) extend in the longitudinal direction of the vehicle on a support (36).

5 Claims, 9 Drawing Sheets

FIG. 12

GUIDE MECHANISM FOR THE COVER PLATE OF A VEHICLE SUNROOF

BACKGROUND OF THE INVENTION

1. Field of the Invention

The invention relates to a device for guiding the cover of a vehicle sliding roof in the region of a roof aperture of a vehicle roof, with mechanical means for controlling the movement of the sliding roof cover.

2. Description of the Prior Art

In customary manner the vehicle sliding roof cover is guided in the region of the roof aperture at both of the borders of the roof aperture which extend along the longitudinal direction of the vehicle, by means of mechanical movement guide means for the sliding roof cover provided there. With special structural shapes, in particular trapezoidal sliding roof covers having a front edge longer than the rear edge, stable guidance of the sliding roof cover when raised or swung outwards at its rear edge raises problems.

BRIEF SUMMARY OF THE INVENTION

It is therefore the object of the invention to achieve a reliable guidance of the sliding roof cover along the longitudinal direction for special structural shapes, in particular trapezoidal sliding roof covers.

According to the invention this object is achieved by having the mechanical means for controlling the movement of the sliding roof cover extending in the longitudinal direction of the vehicle in the middle between both lateral borders of the roof aperture.

In a preferred manner the mechanical means for controlling the movement of the sliding roof cover can be provided on a central support extending in the longitudinal direction of the vehicle in the middle of the roof aperture. One or two mechanical means may be provided on the support for controlling the movement of the sliding roof cover. A pivotal point or axis of rotation, formed at the front edge, for a swing-out movement of the cover can be movable along this central support in the longitudinal direction of the support.

The device for controlling the movement of a cover of a vehicle sliding roof, as described in the German Patent Specification P 43 20 106.7, can serve as mechanical means for controlling the movement of the sliding roof cover.

BRIEF DESCRIPTION OF THE DRAWINGS

The invention will be described in more detail with reference to the Figures. These show.

DETAILED DESCRIPTION OF THE INVENTION

Figure 1:
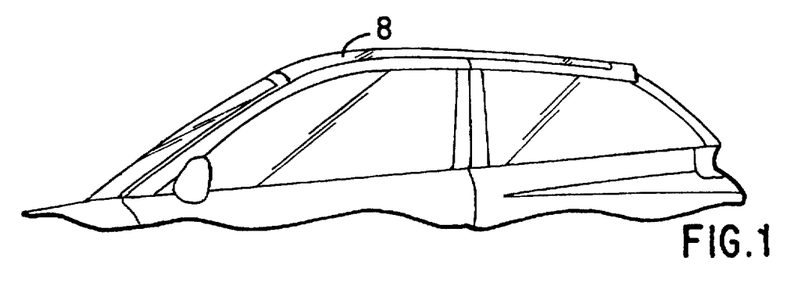
FIG. 1: a side view of the closed sliding roof.
Figure 2:
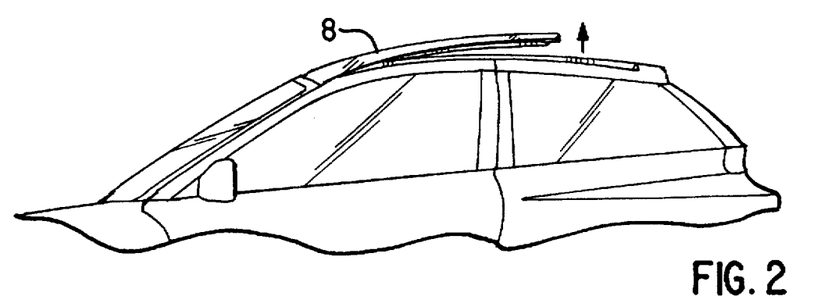
FIG. 2: a side view with a sliding roof cover swung-out at the rear edge, in a front position.
Figure 5:
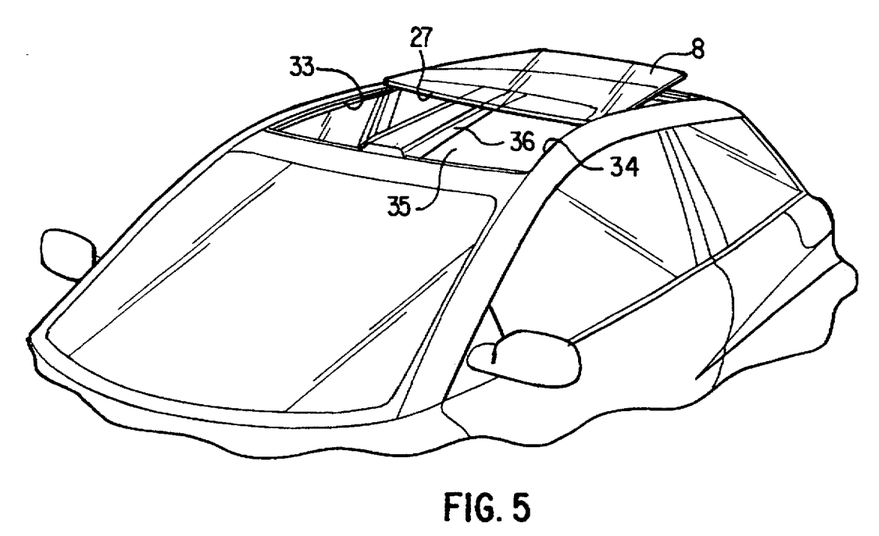
FIG. 5: a perspective view of the sliding roof cover position illustrated in FIG. 3.

In FIG. 5, in particular, a central support 36 can be seen. This central support 36 extends along the longitudinal direction of the vehicle within a roof aperture 35 in the region of which the sliding roof cover 8 is adapted to be swung-out and slidable. The two longitudinal borders 33 and 34 of the sliding roof aperture 35 are matched to the obliquely extending two side edges of the trapezoidal sliding roof cover 8, so that in a closed position (FIG. 1) the sliding roof aperture 35 is tightly shut.

At the cover front edge 27 a pivotal point or axis of rotation for the swing-out movement (FIGS. 2 to 5) of the sliding roof cover 8 is formed on the support 36 by the control means illustrated in FIGS. 6 to 12. This pivotal point or axis of rotation is slidable along the support 36 in the longitudinal direction, as can be seen particularly from the illustration of FIGS. 3 and 5. In this manner a reliable guidance of the swung-out sliding roof cover is achieved, even with special shapes, in particular with trapezoidal sliding roof covers.

With reference to the FIGS. 6 to 12 the means for controlling the movement of the sliding roof cover 9 are set out in more detail.

Figure 12:
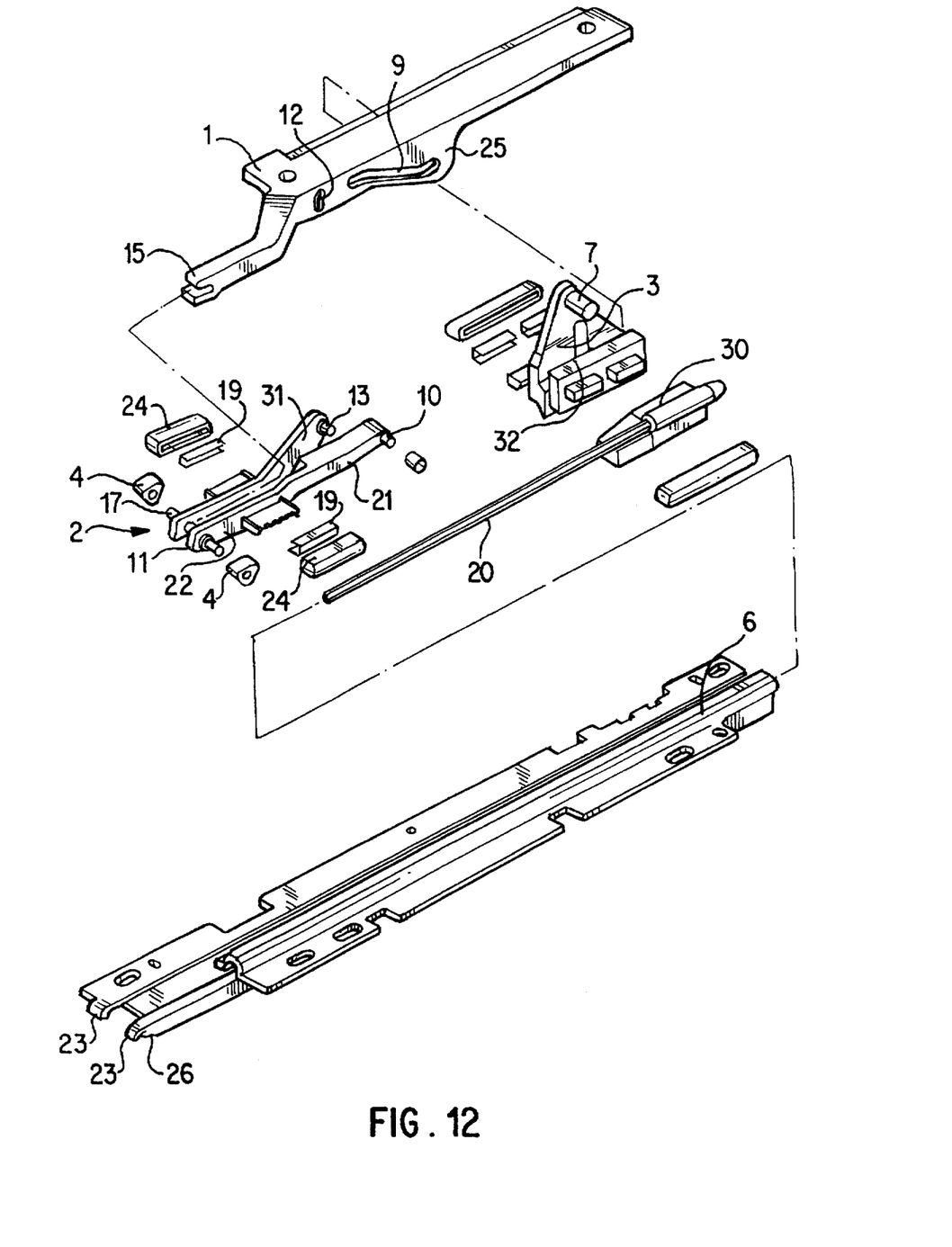
FIG. 12: an exploded view of the essential component parts of the control means for the cover movement.

As is evident particularly from the exploded view of the example of embodiment in FIG. 12, the device for controlling the movement of a vehicle sliding roof cover 8 (FIG. 6–9) has a cover holder 1. In the cover holder 1 a swing-out slotted link 9 is provided into which a swing-out pin 7 on a carriage (transport carriage) 3 projects. Furthermore, on the cover holder a control slotted link 12 is provided. Into this projects a control pin 13 of a swivelling lever 2 guided in a longitudinal guide track 6 (guide rail). The control slotted link extends approximately at a right angle to the longitudinal direction and has a small curvature or a slight bend. Sliding blocks 19 are mounted on both sides of the swivelling lever 2 for guiding the swivelling lever 2 and may consist of a rubber base body. Sliding caps 24 of plastic are placed on the elastic sliding blocks 19. The elastic sliding blocks form a bearing pivot 14 (sliding bearing pivot) for the swivelling lever 2 which is slidable within the longitudinal guide track 6 (FIGS. 6–9).

The swivelling lever 2 is thus formed as a two armed lever. The first lever arm 21 has at its end a lock actuating member in the form of a locking pin 10. The second lever arm 22 possesses at its front end a lifting means designed as a rocking device in the form of rocking levers 4 disposed on both sides. The rocking levers are one-armed levers and possess a shaped part 28 which may be rounded or designed as a roller 5. The rocking levers cooperate with guide means 23 having the form of front guide faces, offset from the horizontal, on the guide rail 6.

The swing-out slotted link 9 and the control slotted link 12 are provided in a guide portion 25, projecting vertically downwards, of the cover holder 1 that has a horizontal mounting plate. The swing-out slotted link 9 has the substantial portion thereof extending inclinedly downwards from the front to the rear and thus determines the lifting motion (swing-out motion) of the cover 8. A receiving fork 15 is provided at the front end of the guide portion 25 to receive the front end of the swivelling lever 2. For this, a bearing pin is provided at the front end of the swivelling lever 2 to form a locating axis 17. The rocking levers 4 are also pivotally supported on both-sided extensions of the bearing pin 5.

The carriage 3 can be driven for movement in the guide rail 6 with the aid of a crank handle or an electric motor drive. The drive is transmitted via a driving cable 20. on the driving cable 20 a sliding block 30 is located that is inserted into the transport carriage 3 for transmission of the movement.

A further movement control member is provided on the swivelling lever 2 in the form of the control pin 13. This is located on a further lever arm 31 at the side of the first lever arm 21. The control pin 13 is joined to the swivelling lever 2 in such manner that it engages in the control slotted link 12 at the guide portion 25 of the cover holder 1. Friction-diminishing rollers may be provided on the locking pin 10 as well as on the control pin 13.

During movement of the transport carriage 3 in the guide rail 6 a combined operation results from the engagement of the swing-out pin 7 in the swing-out slotted link 9, from the engagement of the control pin 13 in the control slotted link 12, from the reception of the front lever arm end 11 in the receiving fork 15 on the guide portion 25, and from the locking pin 10 in such manner that in a first retracted position, with the cover 8 swung-out (FIG. 7), the mechanical components are locked to each other, and with further displacement of the carriage (FIG. 8) the cover front edge 27 is raised by the swivelling lever 2. In this, the pivotal point of the swing-out movement (movement from FIG. 6 to FIG. 7) is shifted to the cover front edge 27.

Various operating positions of the transport carriage 3 and the swivelling lever 2 coupled therewith, and the functional members disposed thereon, are described in more detail with reference to the FIGS. 6 to 9.

Figure 7:
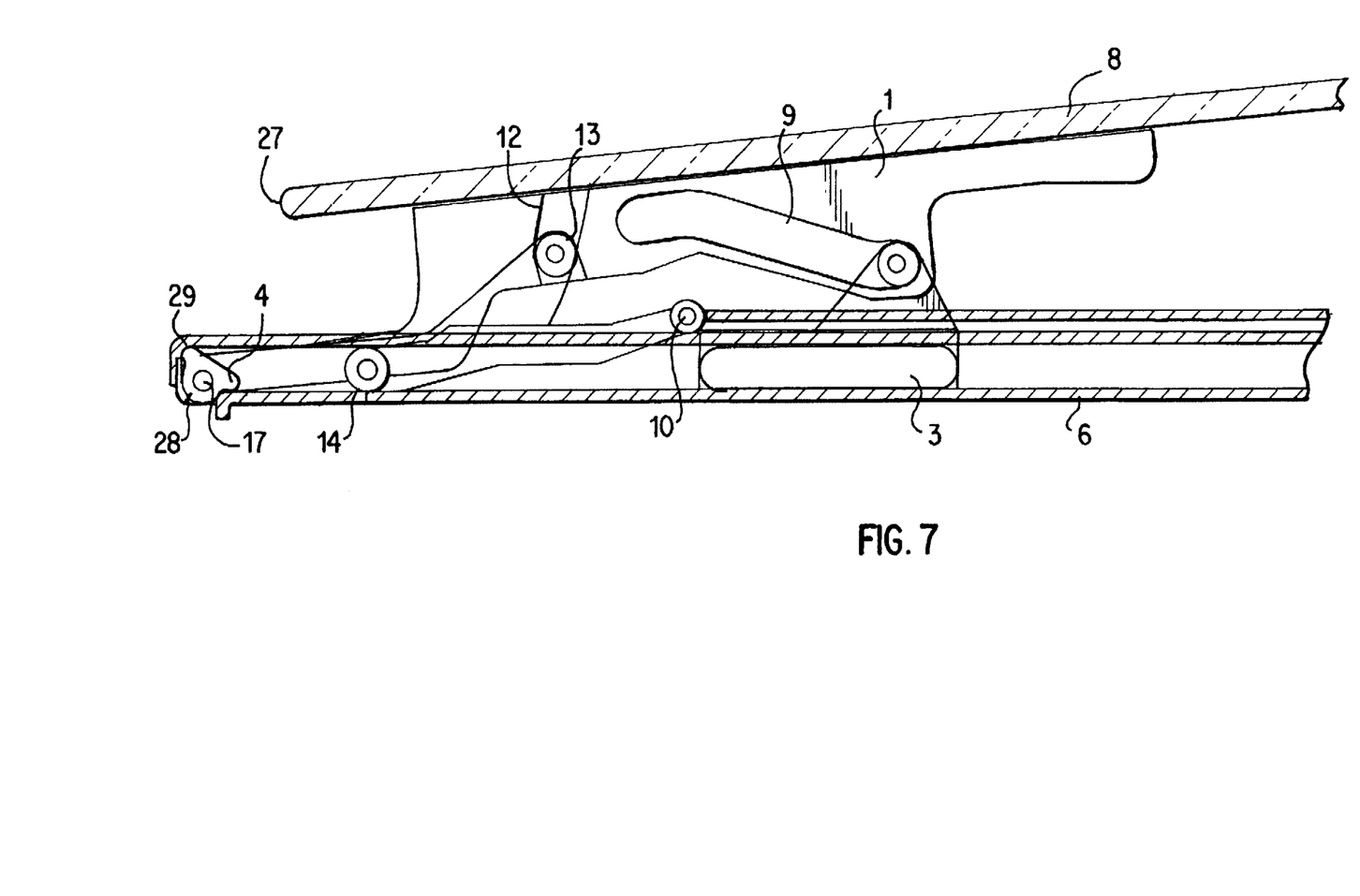
Figure 8:
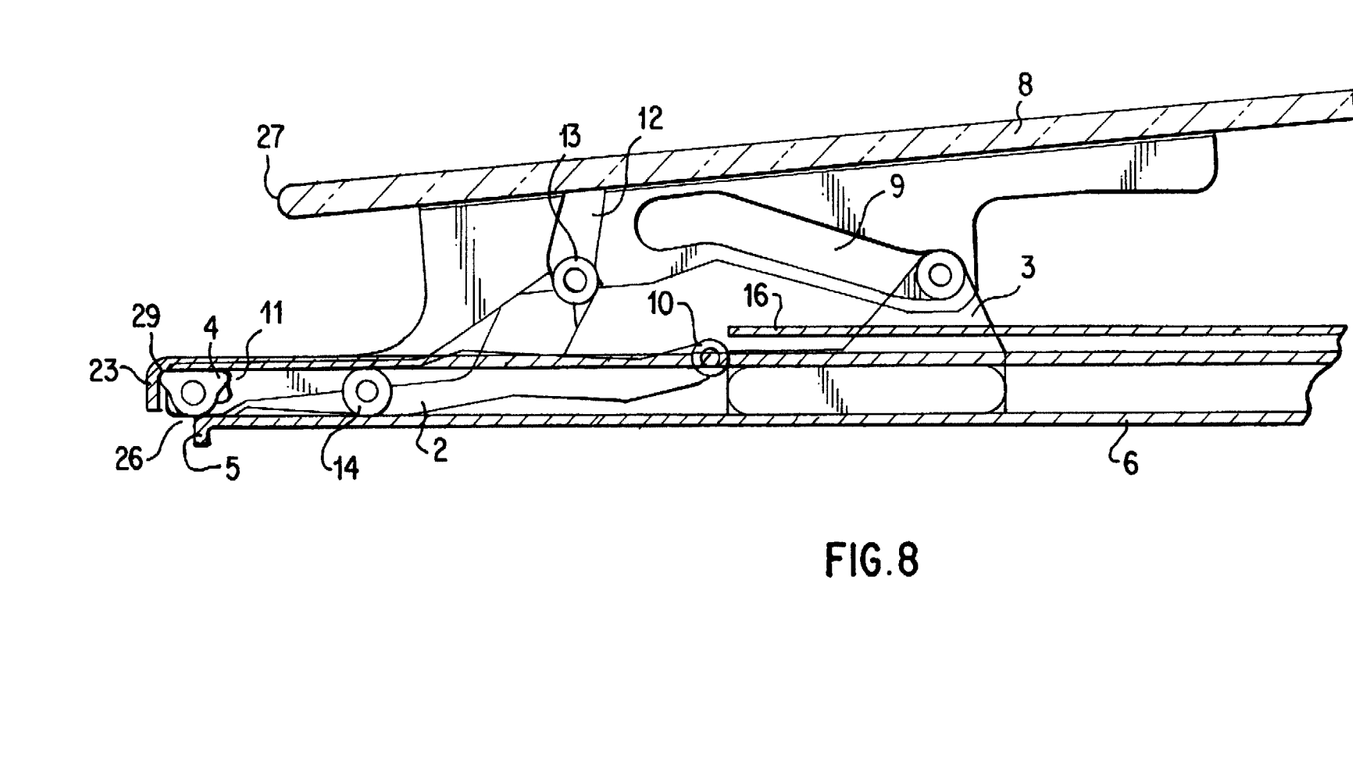
Figure 9:
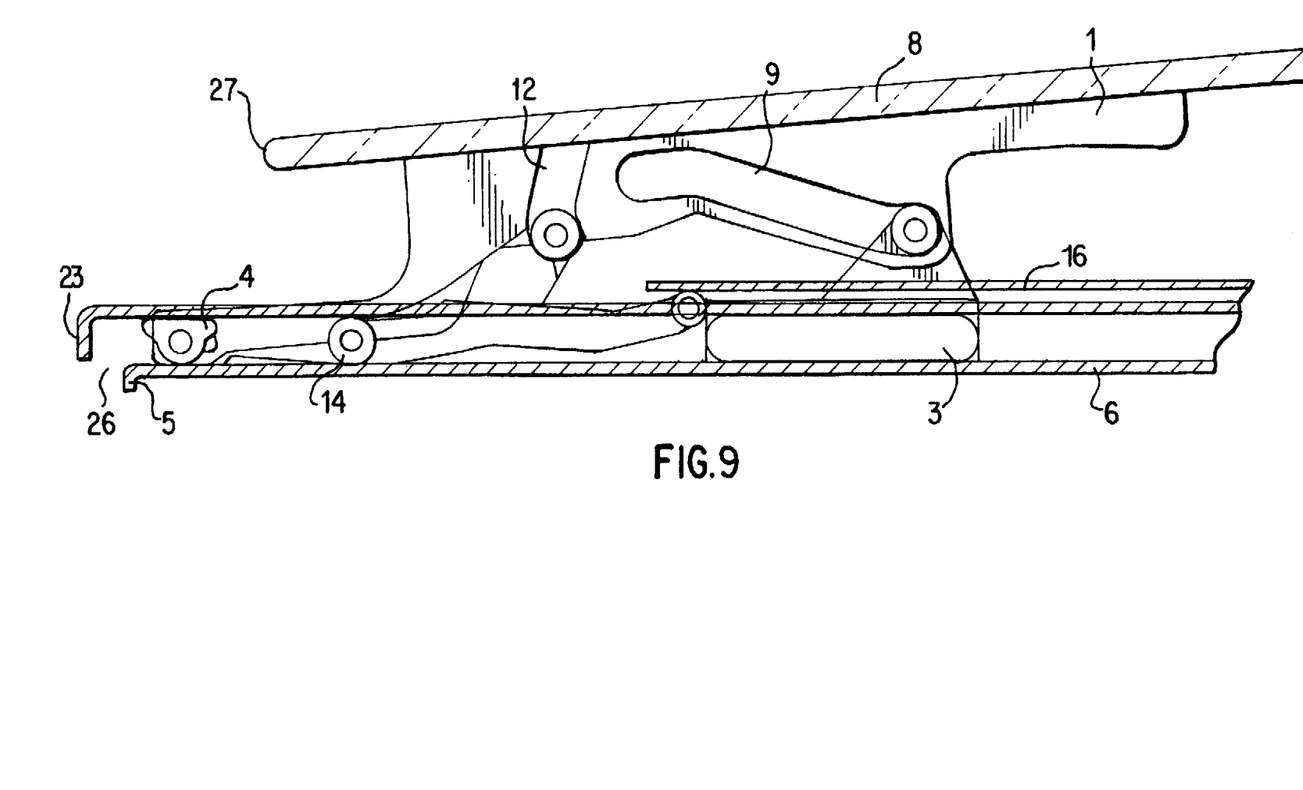
Figure 10:
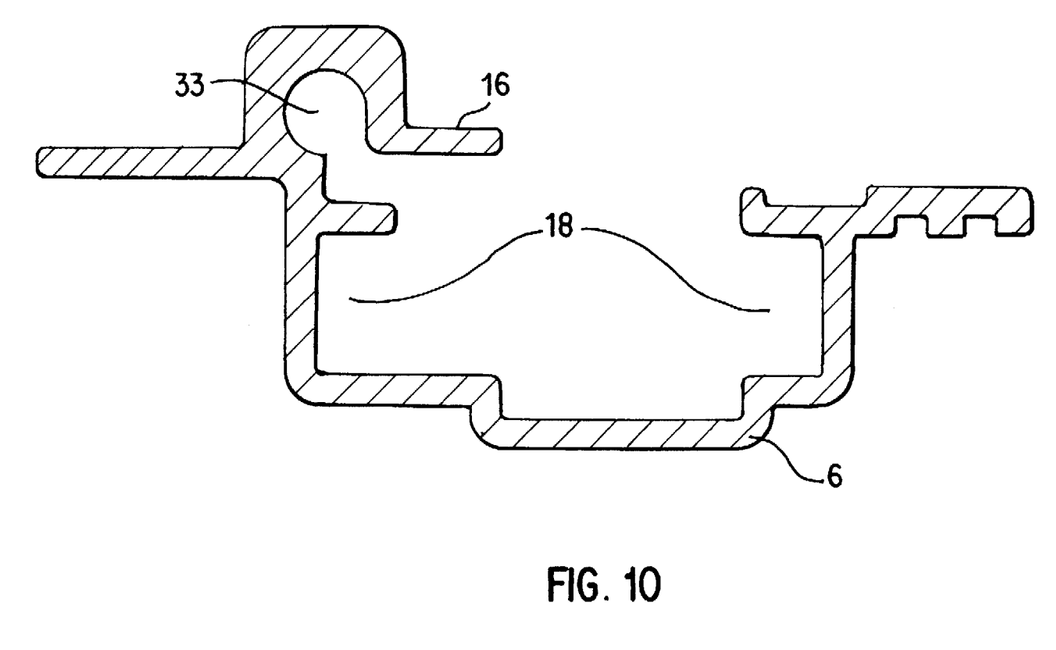
FIG. 10: a cross-section through a guide track for the carriage movement.

By actuation of the hand crank or electric drive the transport carriage 3 sliding in the guide rail 6 is moved via the driving cable 20. The transport carriage 3 engages through the swing-out pin 7 with the swing-out slotted link 9 of the cover holder. The cover holder 1 and the cover 8 are raised at the rear by the longitudinal movement of the transport carriage 3 via this swing-out slotted link 9 (FIG. 7).

The pivotal point of this lifting movement of the cover 3 is located on the cover front edge 27 and is formed with the aid of the control slotted link 12 and the receiving fork 15 in the cover holder. In this, the control pin 13 moves in the control slotted link 12 from an upper position (FIG. 6) into a middle position (7) in which the control slotted link has a slight bend. By this, a defined axis of rotation is produced at the cover front edge 27 for the angular movement during the swing-out (lifting movement) of the cover.

During the lifting movement the locking pin 10 is retained in the locking position by a guide track 32 on the transport carriage 3. In this position the locking pin 10 urges the rocking lever 4 with its rocking lever portion 28 around the pivot 14 of the sliding block bearing of the swivelling lever 2 into an opening 26 at the front end of the guide rail 6. This prevents the cover 8 on the transport carriage 3 from being taken along in the longitudinal direction during the lifting movement of the cover 8. This is achieved by the swivel lever 2 and the cover holder joined thereto being retained at their front end by the rocking lever 4. Hereby the restraint of the longitudinal movement of the cover 8 during the swing-out is achieved by self-acting locking.

After the end of this swing-out movement the swing-out pin 7 in the swing-out slotted link 9 abuts against the rear stop (FIG. 7), and the control pin 13 is located at the bend position in the control slotted link 12. The cover 8 can maintain this swung-out position.

During a further longitudinal movement the transport carriage 3 takes with it the swivelling lever 2 in the longitudinal direction via the cover holder 1 and the control pin 13 brought into the lowest position in the control slotted link 12. At the beginning of the longitudinal movement of the cover the swivelling lever 2 also tilts around the bearing pivot 14 with the locking pin 10 downwards, and with the rocking lever bearing pivot, lying on the receiving axis 17 at the lever end 11, upwards. The locking pin 10 plunges downwards behind the end of the guide track 32 of the transport carriage 3 and is drawn-in below a guide ridge 16 (FIGS. 8, 9) of the guide rail 6. In this position, the transport carriage 3 is clamped to the swivelling lever 2 via the cover holder 1.

Figure 6:
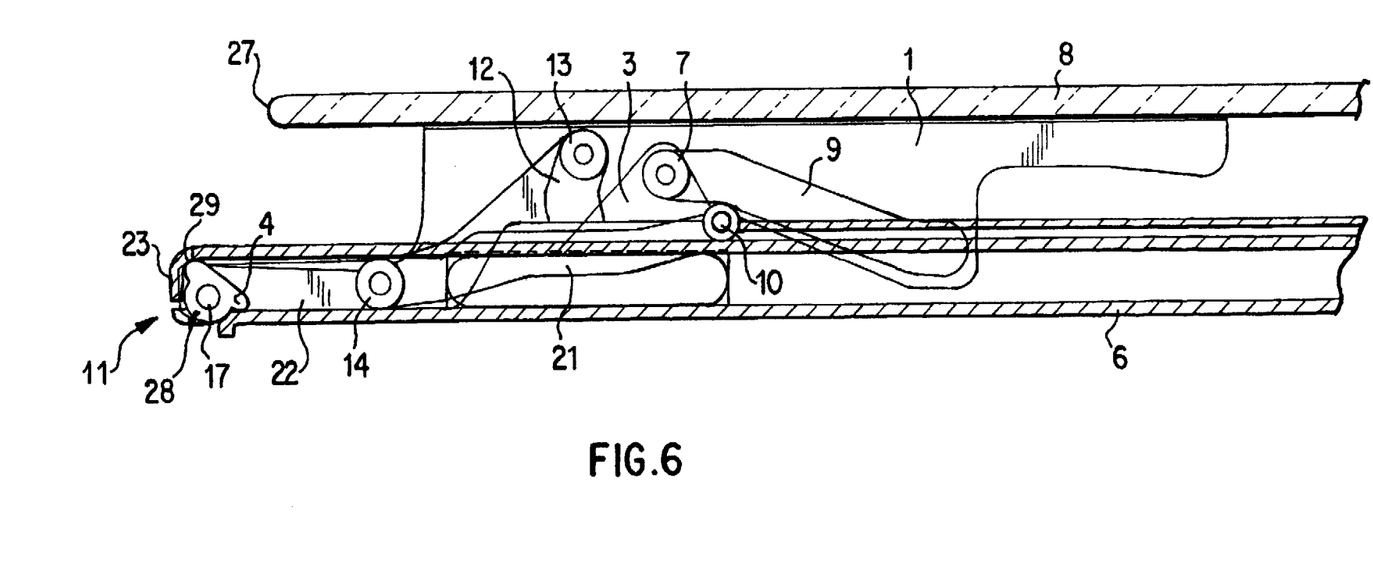
FIGS. 6 to 9: various operating positions of the device for controlling the cover movement.

This first longitudinal and rocking movement of the swivelling lever 2 is produced by the rocking lever 4 and the rocking lever portion 28 which, for example, is designed as a rocking lever roller or formed on the same piece, pivotally supported on the locating axis 17 of the swivel lever. In this, the rocking lever 4 cooperates with inclined or rectangularly offset guide means at the front end of the guide rail 6. In the illustrated example of embodiment the guide means are formed by a rectangularly offset portion 23 of the upper, horizontally extending rail portion of the guide rail 6 and a lower, rectangularly offset rail portion 5. The opening 26 is formed between both rail portions at the beginning of the guide rail 6. In the corner between the upper, horizontally extending rail portion of the guide rail 6 and the offset rail portion 23 a bearing pivot for the rocking lever 4 is formed which forms a pivotal point 29 for the swivelling movement or rocking movement of the rocking lever 4 during the movement from the position of FIGS. 6 and 7 into the position of FIG. 8. During this movement the rocking lever portion 28 located in the opening 26 in FIGS. 6 and 7 is lifted out of the opening 26. The pivotal point 29 is located above the pivotal point or the bearing pivot 14 of the two-armed swivelling lever 2. The rectangularly offset front guide rail ends 5 and 23 may both or each singly also have an inclined shape for defining the opening 26. During the movement of the rocking lever 4 from the position illustrated in FIGS. 6 and 7 into the position illustrated in FIG. 8, the front lever arm end 11 of the two-armed swivelling lever 2 is raised. Hereby the front edge 27 of the cover 8 is also raised with simultaneous lowering of the rear portion of the cover 8. This achieves a lifting out of the cover front edge 27 from the seal portion during the opening operation, and a lowering of the cover front edge 27 onto the seal portion during the closing operation.

Figure 11:
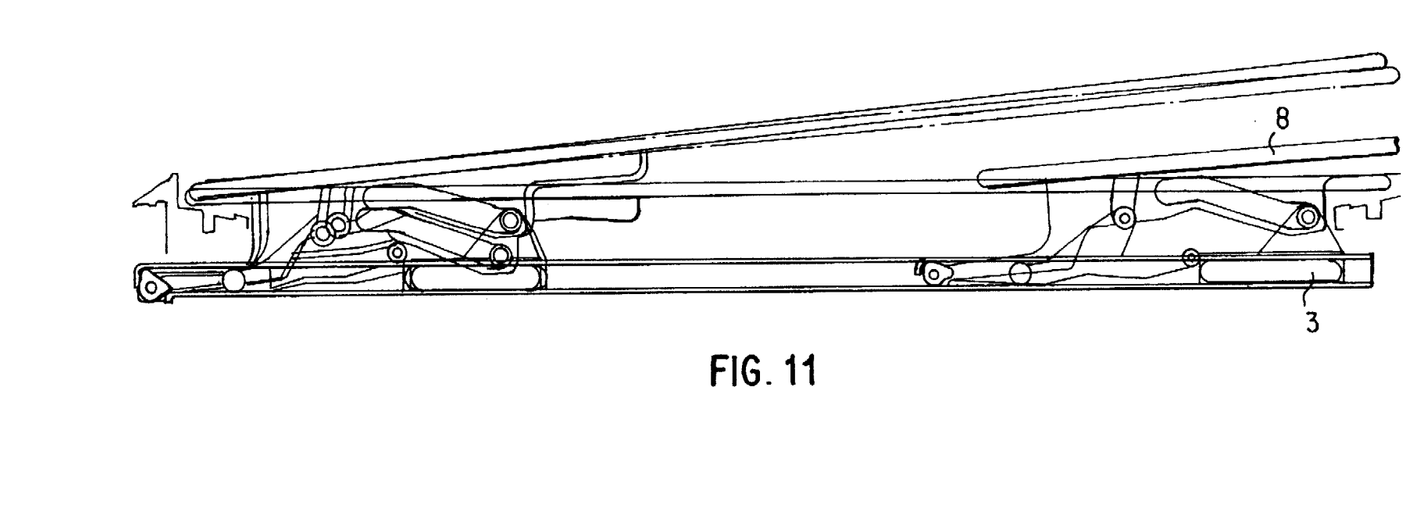
FIG. 11: an overall view of the control device in which various cover positions and positions, in particular the two end positions, are shown.

During further longitudinal displacement of the carriage 3 in the direction towards the end position illustrated in FIG. 11, the transport carriage 3, the sliding caps 24 which together with the sliding blocks 19 form the bearing pivot 14 of the swivelling lever 2, and the rocking lever 4 move along guide tracks 18 (FIG. 10) of the guide rail 6. The driving cable 20 extends along a guide channel 33. The locking pin 10 slides along the guide ridge 16.

The rocking lever 4 is in an upwardly abutting position in the rail 6 and rests against the horizontal surface of the rail 6. Thereby the rocking lever 4 with the rocking lever portion 28 slides without friction into the guide rail 6 as far as the rear end position shown in FIG. 11 in which the cover 8 is removed from the roof aperture.

The rocking lever 4 is thus operative in positionally determining the pivotal point of the cover at the cover front edge 27, the raising and lowering of the cover 8, and the creation of the restraint of the attendant movement of the cover 8 when swinging outwards.

Figure 3:
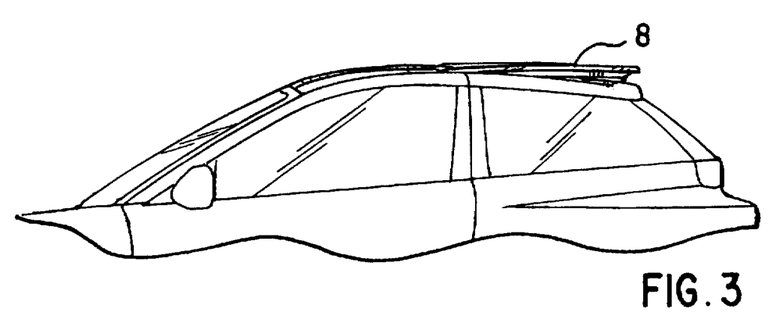
FIG. 3: a side view with a sliding roof cover swung-out at the rear edge, in a rear position.
Figure 4:
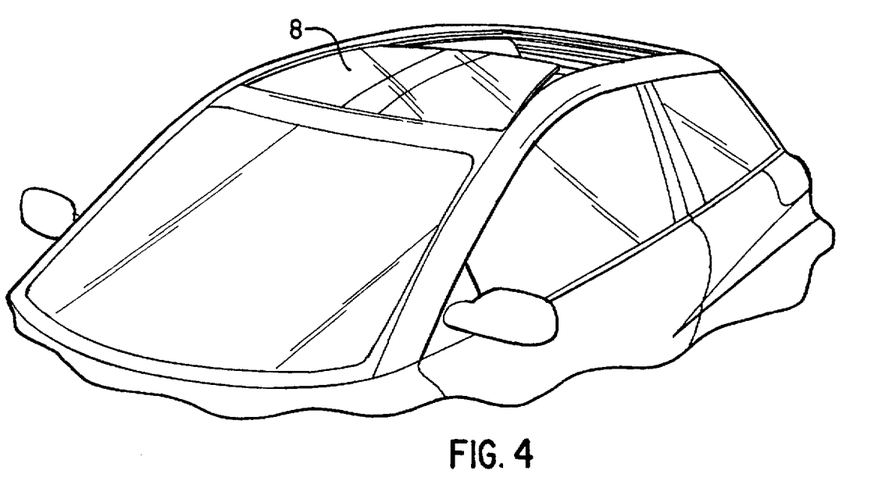
FIG. 4: a perspective view, seen obliquely from above, of the sliding roof cover position illustrated in FIG. 2.

During the raising of the front edge 27 of the cover, the rear edge of the cover is slightly lowered, so that during its longitudinal displacement with respect to the roof surface of the motor vehicle the cover has a very flat angle of rise or extends substantially parallel to the roof surface (FIG. 3).

I claim:

1. A device for controlling the movement of a vehicle sliding roof cover comprising:

a central support extending in a longitudinal direction of the vehicle and located centrally in a roof aperture, a guide track defined on said central support, a carriage coupled to the sliding roof cover and movable along said guide track, a drive means for driving said carriage, lifting means for swivelling the sliding roof cover around a bearing axis into a raised position, and a guide means for guiding a cover front edge of the sliding roof cover for pivoting movement when swivelling the sliding roof cover around the bearing axis and imparting to the cover front edge a lifting movement during a transition between swivelling and longitudinal shifting movement of the cover, wherein said guide means includes a two-armed swivelling lever and a guide portion of a cover holder joining said swivelling lever to said sliding roof cover, and said swivelling lever includes a lock actuating member cooperating with the carriage during the lifting movement of the cover front edge to restrain a longitudinal shift of the cover.

2. A device according to claim 1, characterized in that the bearing axis is movable along the central support by the drive means.

3. A device according to claim 1, wherein a rear edge of the cover is lowered as said lifting movement is imparted to the cover front edge.

4. A device according to claim 1, wherein the swivelling lever has a first lever arm with said lock actuating member, said lock actuating member resting against the carriage to hold the swivelling lever in its position and restrain the longitudinal shift of the cover during the lifting movement.

5. A device according to claim 4, wherein while swivelling the sliding roof cover, a second lever arm of the two-armed lever, together with a control slotted link on the cover holder in which a control pin joined to the swivelling lever engages, positionally determines a pivotal point of the pivoting movement.

* * * * *